United States Patent [19]

Bradshaw, II et al.

[11] Patent Number: 4,889,420

[45] Date of Patent: Dec. 26, 1989

[54] METHOD AND MEANS FOR SECURING GLASSES TO A SUN VISOR

[76] Inventors: Robert J. Bradshaw, II, 4408 67th St., Des Moines, Iowa 50322; Robert J. Bradshaw, III, 2230 SE. Caulder Ct., Des Moines, Iowa 50320

[21] Appl. No.: 319,269

[22] Filed: Mar. 6, 1989

[51] Int. Cl.⁴ .......................... G02C 9/00; G02C 7/08
[52] U.S. Cl. ....................................... 351/47; 351/48; 351/57; 351/58
[58] Field of Search ....................... 351/44, 47, 48, 57, 351/58; 2/13

[56] References Cited

U.S. PATENT DOCUMENTS 3,876,295 4/1975 Laughver .......................... 351/47

Primary Examiner—Rodney B. Bovernick
Attorney, Agent, or Firm—Zarley, McKee, Thomte, Voorhees & Sease

[57] ABSTRACT

The device of the present invention includes a plastic body member having a pair of upwardly spaced-apart legs and a pair of downwardly spaced-apart legs. The downwardly spaced-apart legs are adapted to spring apart and yieldably grip a sun visor therebetween. The upwardly spaced legs have an elastomeric member therein which forms a V-shaped slot for receiving the nose frame of a pair of glasses.

10 Claims, 1 Drawing Sheet

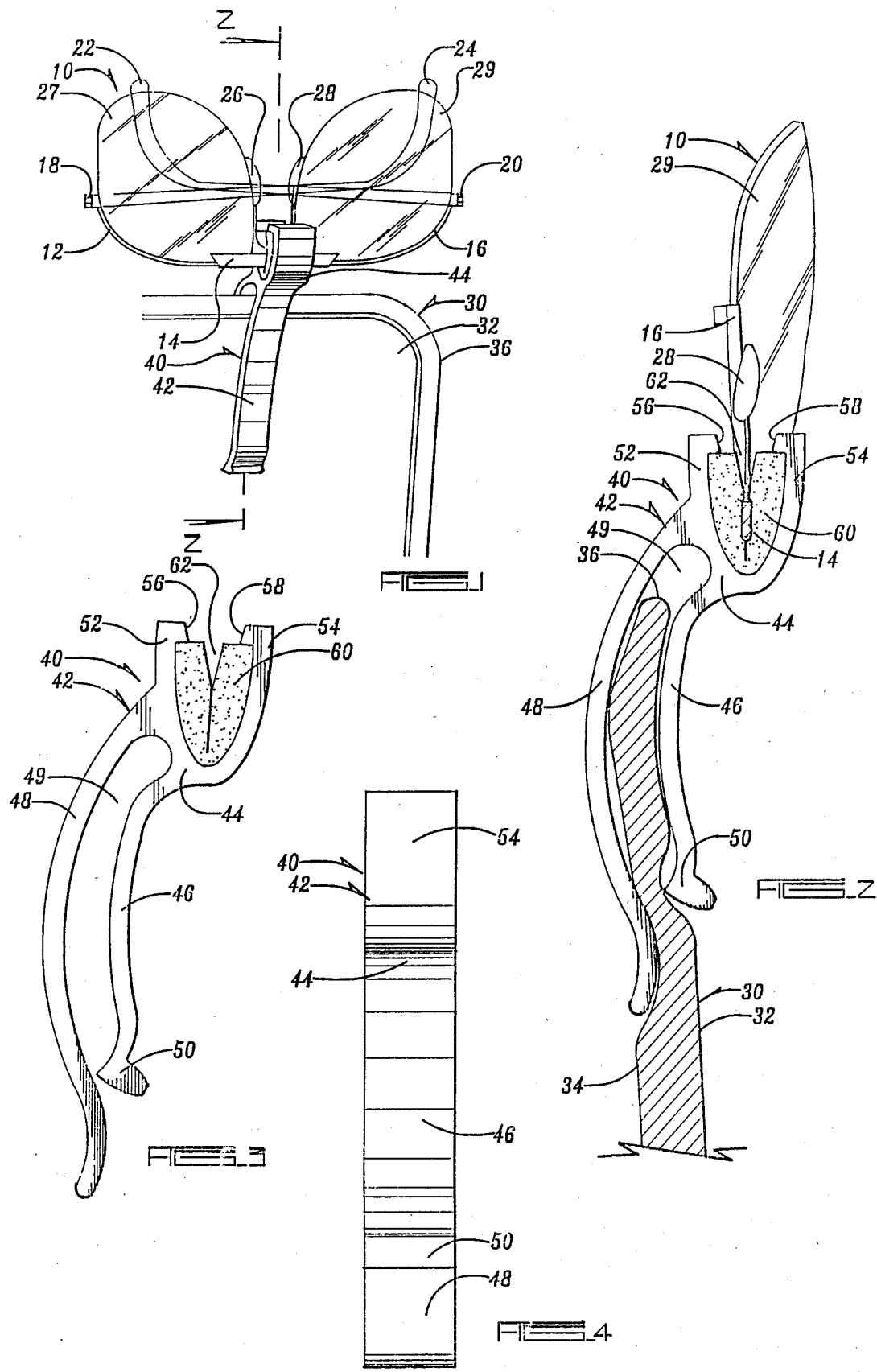

METHOD AND MEANS FOR SECURING GLASSES TO A SUN VISOR

BACKGROUND OF THE INVENTION

This invention relates to a method and means for securing glasses to a sun visor.

Sunglasses are often needed when driving vehicles. However, sometimes, such as at night, the sunglasses are not needed by the driver. At these times, it is desirable to have a satisfactory place to store the glasses where they can be easily stored and retrieved without distracting the driver from driving the vehicle.

Therefore, a primary object of the present invention is the provision of an improved method and means for securing glasses to a sun visor.

A further object of the present invention is the provision of a device which can be easily detachably secured to a sun visor.

A further object of the present invention is the provision of a device which permits the quick and simple attachment of the glasses to the sun visor without distracting the driver from his driving operation.

A further object of the present invention is the provision of a device which is economical to manufacture, durable in use, and efficient in operation.

SUMMARY OF THE INVENTION

The present invention includes an elongated plastic body member having a central portion, a first pair of spaced-apart legs extending in a first direction away from the central portion, and a second pair of spaced-apart legs extending in a second direction away from the central portion. The first pair of legs are adapted to retentively embrace the opposite sides of the sun visor of a vehicle. The second pair of legs are adapted to receive the nose frame of a pair of eyeglasses. An elastomeric material coats the interior surfaces of the second pair of legs, and forms a V-shaped notch therein. The nose frame of the glasses can be inserted into the V-shaped notch, and upon insertion causes the compression of the elastomeric material forming the V-shaped notch. This compression of the elastomeric material causes the second pair of legs and the elastomeric material to combine to retentively hold the glasses in place.

However, when the operator wishes to remove the glasses from the holder, it is merely necessary to lift the glasses upwardly out of the V-shaped notch.

BRIEF DESCRIPTION OF THE DRAWINGS

FIG. 1 is a partial perspective view showing the device of the present invention mounted on a sun visor and holding a pair of sunglasses.

FIG. 2 is a sectional view taken along line 2—2 of FIG. 1.

FIG. 3 is a side elevational view of the device of the present invention.

FIG. 4 is a front elevational view taken from the right of FIG. 3.

DESCRIPTION OF THE PREFERRED EMBODIMENT

Referring to FIG. 1, a pair of eyeglasses 10 includes an elongated eyeglass frame comprising a first glasses frame 12, a nose frame 14, and a second eyeglasses frame 16. At the ends of frames 12 and 16 are a pair of hinges 18, 20 which pivotally support a pair of ear frames 22, 24. Attached to nose frame 14 are a pair of nose rests 26, 28. A pair of eye pieces 27, 29 are attached to the various frame members described above in conventional fashion.

Also shown in FIG. 1 is a partial view of a sun visor 30 having a front face 32, a rear face 34 (FIG. 2), and an perimetric edge 36.

The device of the present invention is generally designated by the numeral 40 and is comprised of a body member 42 having a central portion 44. Extending downwardly from central portion 44 are a first long leg 46 and a second long leg 48. These legs are spaced apart, and are yieldable away from one another. At the lower end of leg 46 is a node 50 which in its normal position is closely adjacent or touching the lower end of leg 48. The remainder of legs 46, 48 are spaced apart from one another as indicated by the space 49 in FIG. 3. Legs 46, 48 are positioned with respect to one another to be a distance apart which is less than the thickness of the sun visor 30.

As can be seen in FIG. 2, the legs 46, 48 can be spread apart so that they can be fitted over the opposite faces 32, 34 of sun visor 30. The spring action of the two legs 46, 48 causes node 50 to press against the face 32 of visor 30 and retentively hold the device 40 detachably to the sun visor 30.

Extending upwardly from the central portion 44 are a first short leg 52 and a second short leg 54, each of which have inwardly extending lips 56, 58 at their upper ends respectively. Legs 52, 54 are spaced apart and are provided with an elastomeric material or lining 60 which is attached to their interior facing surfaces and which forms a V-shaped notch 62. The lips 56, 58 abut the ends of the elastomeric material 60 and help retain the elastomeric material 60 in place. Adhesive or other suitable means can also be used to help hold the elastomeric material in place.

Body member 42 can be formed from a plastic material or from metal, and the primary requirement is that the leg members 46, 48 have sufficient resiliency to spread apart and frictionally embrace the opposite faces 32, 34 of sun visor 30. The elastomeric material 60 may be rubber or other elastomeric material. Preferred material is an elastic polyethelene foam. In order to utilize the device, the legs 46, 48 are fitted over the sun visor 30 in the manner shown in FIG. 2. The glasses can be attached to the device by inserting the nose frame 14 into the V-shaped notch 62 are shown in FIG. 2. This causes the elastomeric material 60 to compress against the spaced apart legs 52, 54. The compression causes the elastomeric material to yieldably hold the glasses in place as shown in FIGS. 1 and 2. When it is desired to remove the glasses, all that is necessary is to manually pull the glasses upwardly out of the V-shaped notch. The device easily holds the glasses in place and prevents them from falling loose during the normal movement and vibration of the vehicle. The device is simple to manufacture and efficient in operation, and therefore, it is believed that the device accomplishes at least all of its stated objectives.

We claim:

1. A device for securing glasses to a sun visor, said glasses having a frame comprising a central nose frame and a pair of opposite glass frames extending from opposite sides thereof, said nose frame having a predetermined thickness, said sun visor comprising an elongated flat member having opposite surfaces spaced a predetermined distance from one another and having a perimetric edge extending therearound, said device comprising:

an elongated body member having a central portion, a first pair of spaced apart legs extending in a first direction away from said central portion and a second pair of spaced apart legs extending in a second direction away from said central portion;

said first pair of legs yieldably movable apart from one another and being spaced part a first distance which is less than said predetermined distance between said opposite sides of said elongated flattened member of said sun visor, whereby said first pair of legs may be positioned an opposite sides of said flattened member to yieldably retentively embrace said flattened member therebetween;

said second pair of legs having spaced apart inwardly facing surfaces presented toward one another, an elastomeric material secured to and covering said facing surfaces of said second pair of legs and forming an approximately V-shaped notch therebetween, said V-shaped notch being sized to receive said nose frame of said glasses whereby said elastomeric material on said facing surfaces of said second pair of legs will yieldably compress toward said facing surfaces and retentively engage and hold said glasses.

2. A device according to claim 1 wherein said first pair of legs are longer than said second pair of legs.

3. A device according to claim 2 wherein said first pair of legs comprise a first long leg and a second long leg, said first long leg having a distal end closely adjacent said second long leg, the remaining portion of said first long leg being spaced away from said second long leg.

4. A device according to claim 3 wherein said distal end of said first long leg includes a node projecting toward said second long leg and adapted to frictionally engage one of said opposite surfaces of said flat member of said sun visor when said first pair of legs are positioned on opposite sides of said own visor.

5. A device according to claim 3 wherein said first long leg is shorter than said second long leg.

6. A device according to claim 2 wherein said second pair of legs comprise a first short leg and a second short leg, each of which have a distal end and a lip on said distal end, said lips of said first and second short legs projecting inwardly toward one another.

7. A device according to claim 6 wherein said elastomeric material includes two edges, each of which abuts against one of said lips, whereby said lips facilitate securement of said elastomeric material to said first pair of legs.

8. A device according to claim 2 wherein said first pair of legs define an elongated first slot therebetween and said second pair of legs define an elongated second slot, the longitudinal axes of said first and second slots being generally offset laterally with respect to one another.

9. A device according to claim 8 wherein said first pair of legs are arcuate in shape along their lengths.

10. A method for using the device of claim 1 comprising: spreading said first pair of legs sufficiently far apart to permit them to embrace the opposite surfaces of said member of said sun visor;

sliding said first pair of legs over said member of said sun visor so that they frictionally embrace said opposite surfaces of said sun visor member and detachably hold said body member to said sun visor member;

inserting said nose frame of said glasses into said V-shaped notch between said elastomeric material on said inwardly facing surfaces of said second pair of legs, said insertion continuing until said nose frame compresses said elastomeric material, whereby said second pair of legs and said elastomeric material combine to detachably hold said nose frame in said V-shaped notch.

* * * * *